United States Patent Office 3,390,919
Patented July 2, 1968

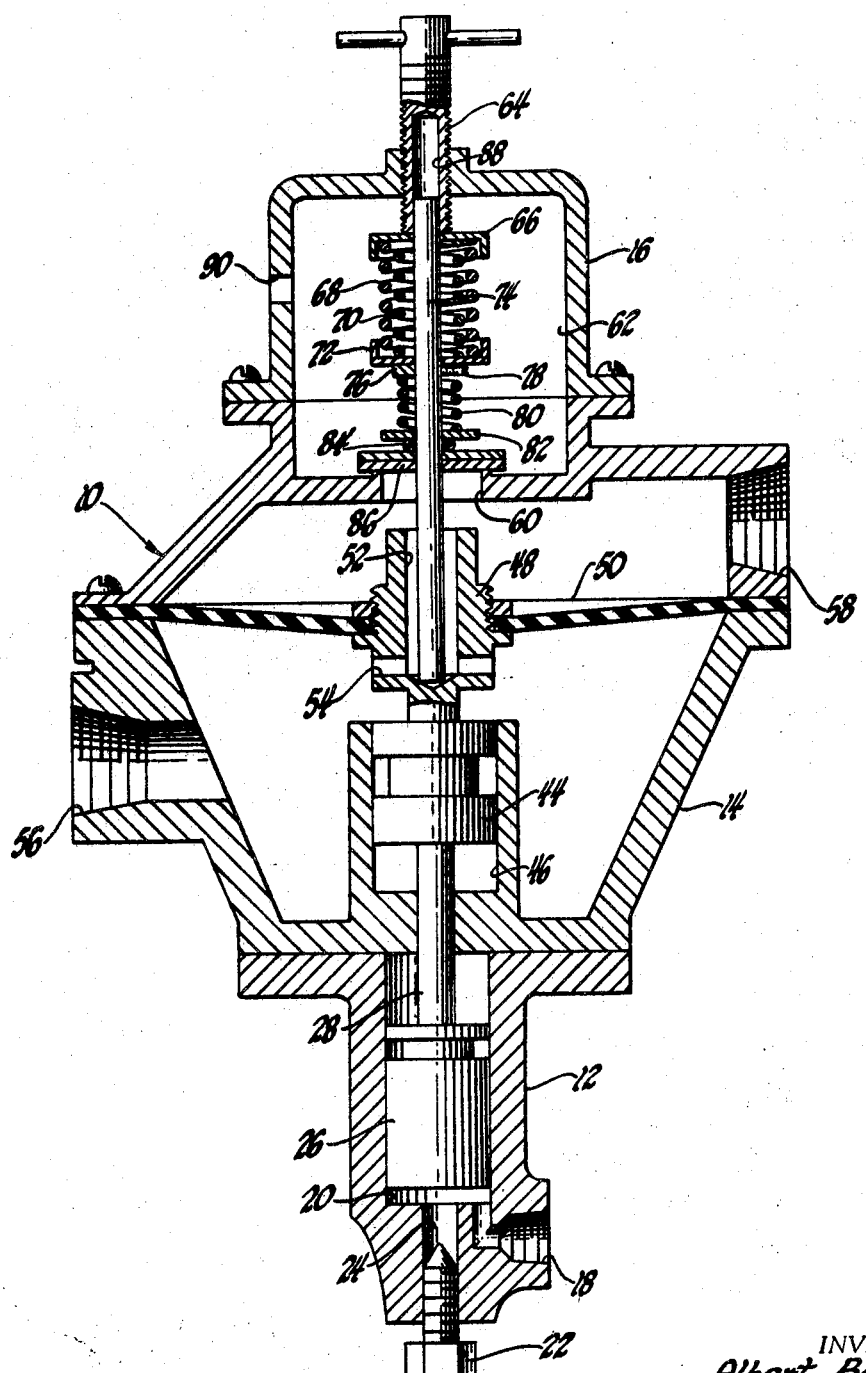

3,390,919
CONTROL VALVE
Albert Boyce, 217 Cogshall, Holly, Mich. 48442
Filed July 12, 1965, Ser. No. 471,058
6 Claims. (Cl. 303—31)

ABSTRACT OF THE DISCLOSURE

A hydraulic actuated vacuum controlled valve mechanism for vehicle braking systems including means outside of the vacuum chamber area for varying the resistance of the diaphragm passage member to positive pressure means acting to close it against a biased closure venting one side of the vacuum control system.

---

This invention relates to brake control mechanisms in general and more particularly to a brake control valve for use with different tractor-trailer vehicle combinations using hydraulic and vacuum controlled brakes.

Brake control on tractor-trailer vehicles is extremely important. The tractor unit must have an independent brake system, or at least a system which will enable it to operate independently as a highway vehicle with adequate braking protection. The trailer unit must also include a brake system and one which may be activated before the tractor brakes take effect to prevent the trailer from jack-knifing.

Efforts to provide separate operable brake control systems for tractors and trailers have not been well received since, in an emergency, the vehicle operator may not be able to act quick enough to activate both systems or to do so in the right order. At the same time, although brake systems have been devised which coordinate the braking effort as regards the tractor and trailer through a single operator mechanism, these have not been too successful since different tractor-trailer combinations are continually being used and it is virtually impossible to change or rebuild a control mechanism to suit the numerous different braking effort combinations which arise.

Most control mechanisms for tractor-trailer brakes are either of the hydraulic or vacuum control type. In each instance, the braking effort is regulated by a change in the line pressure to the brakes. A combination control mechanism may use a change in hydraulic fluid line pressure created by brake pedal action to control the braking force for the tractor and to, in turn, affect a change in vacuum line pressure for actuating vacuum power brakes on a trailer. As will be appreciated, this allows a gradual change to be affected as regards the trailer brakes, and a change in direct portion to the braking force of the tractor but following thereafter.

Generally speaking, this type of combination control valve for brake systems makes use of different control springs, balance springs and return springs disposed between a positive pressure responsive element and a vacuum responsive diaphragm member to establish a direct ratio responsiveness in the latter which controls the braking effort to trailer brakes. In such devices these springs must be changed to make the diaphragm more or less responsive to the positive braking effort initiated at the tractor-cab. This is difficult, troublesome and far from fool-proof.

Every time a valve is taken down to change anything, it is possible that some part may be excluded or some seal may be broken which will cause an oil or a vacuum pressure leak.

Changing complete valve assemblies is no easier.

Highway safety requires some ready means of regulating the braking effort between tractors and trailers to enable any reasonable combination and to provide more versatile brake control for different and optional trailer loads.

It is an object of this invention to provide a control means for positive pressure operated vacuum pressured control valves, and more particularly for such valves used to operate tractor-trailer brakes, which is capable of ready and simple adjustment.

It is an object of this invention to provide a control mechanism for hydraulic operated vacuum control valves, for operating tractor-trailer brakes, which is inexpensive to produce and provide in existing control systems.

It is an object of this invention to provide control means for hydraulic operated vacuum control valves, which makes use of a minimum of parts most of which are readily available, compactly arranged, and capable of being provided on control mechanisms already in use as a field change.

In general, it is an object of this invention to provide a vacuum control mechanism particularly suited for hydraulic operated vacuum control valves which will prevent the venting of one side of a diaphragm to atmospheric conditions, necessary to obtain maximum braking at the trailer, until a pre-determined pressure condition exists and to do so by means of overriding regulatory spring means readily controlled to obtain different prescribed conditions.

These and other objects and advantages to be gained in the practice of this invention will be better understood and appreciated upon the reading of the following specification in regard to a preferred embodiment of the invention and having reference to the accompanying drawing.

In the drawing:

FIGURE 1 is a cross-sectional elevation of a positive pressure responsive vacuum control valve including the features of this invention.

In the discussion which follows the disclosure of U.S. Patent 2,215,172 titled Control Valve granted Sept. 17, 1940, to Christenson is to be considered a part of this disclosure. The patent mentioned is directed to a control valve which may be adapted to include the features of this invention and discloses how the valve may be used in an operative system. References made to the Christenson patent are to avoid the necessity of a duplication of description and drawings on matters well known in the art.

In the attached drawing, the positive pressure responsive vacuum controlled valve is identified by the numeral 10. It includes a positive pressure responsive mechanism disposed within a housing 12 which is connected to a vacuum pressure chamber member 14 having a vacuum pressure control mechanism provided therein. On the opposite end of the vacuum pressure chamber member 14, from the housing 12, is provided the control housing member 16 which includes the novel features of the present invention.

The housing member 12 is formed to provide a passage 18 receptive of a positive pressure hydraulic line (not shown). The passage 18 is in communication with a pressure chamber 20 formed within the housing 12. A bleed screw 22 is provided within a bleed passage 24 which also connects to the pressure chamber 20.

Within the pressure chamber 20 is provided a fluid pressure responsive piston member 26. The piston member 26 has an actuator pin 28 disposed in engagement therewith for actuation by the piston under the influence of fluid pressure within the chamber 20.

The actuator pin 28 includes an enlarged part 44 which is guided within a bore 46 provided in the vacuum pressure chamber member 14. It also includes a vacuum passage member 48 which is a part thereof and is provided on the upper disposed end thereof within the vacuum pressure chamber member.

A diaphragm member 50 extends across the vacuum chamber in the vacuum pressure chamber member 14 and has the valve passage member 48 engaged thereto and formed to provide passages 52 and 54 for communication between the sides thereof. A vacuum line port 56 is provided on one side of the diaphragm 50 and a control line port 58 is provided on the other side thereof. An atmospheric port 60 is provided through the top of the vacuum pressure chamber member 14 and is closed by a valve disc later described and identified.

The housing member 16 which is secured to the top of the vacuum pressure chamber member 14 includes a chamber 62 within which is provided a thumb screw member 64 extending through the upper wall thereof and aligned with the atmospheric port 60 and the diaphragm passage member 48 disposed thereunder. It includes a spring seat 66 under which is disposed a pair of compression springs 68 and 70 which are right and left wound and are, in turn, engaged with a spring seat member 72 provided on a guide member 74.

The spring seat 72 on the guide member may be axially adjusted by means of an adjustable collar 76 including a set screw 78 for retaining engagement with the guide member. The collar member 76 also serves as a spring seat for a return spring 80 which has the other end engaged with a spring seat member 82 on the guide member and under which is provided a sealing ring 84 about the guide member for sealing it as it extends through the valve disc 86 which closes the atmospheric port 60.

The lower end of the guide rod member 74 is received within the passage 52 of the valve passage member 48 and bottoms in the bore under the influence of the springs 68 and 70 without obstructing air flow communication through the passage.

The guide rod member 74 is also received and guided within a bore 88 provided in the thumb screw member. The bore 88 is of sufficient depth to keep the guide rod from bottoming before the valve disc 86 is lifted and, consequently, from bottoming at all in the thumb screw bore.

The housing member 16 within which is provided the control mechanism last mentioned is open to atmospheric pressure by means of an atmospheric vent 90 provided through a side wall.

The control valve operates as follows:

Brake pedal pressure induces hydraulic fluid pressure through passage 18 to chamber 20 and lifts the piston 26. As the piston moves up in the bore 20 it carries with it the actuator pin 28. The actuator pin in turn moves the passage member 48, on the diaphragm 50, towards the valve disc 86 which closes the atmospheric port 60.

The port 60 is large enough to receive the upper end of passage member 48 through it, with quite a bit of clearance, and into engagement with the valve disc 86 thereover. When the passage member engages the valve disc 86, it causes passage 52 to be closed and shuts off the vacuum port 56 from the upper side of the diaphragm and from port 58.

With further effort, to overcome the resistance of springs 68 and 70, on rod 74, and that of spring 80, on the disc itself, the passage member 48 will lift the valve disc 86 from its seat over port 60 and vent the upper side of the diaphragm and port 58 to atmospheric pressure. This, of course, immediately sets the brakes as is desired.

At the same time, the vacuum pressure under the diaphragm 50 works to pull the passage member down, to allow the valve disc 86 to reseat and close the annular space between the walls of port 60 and the passage member. The spring effort of springs 68 and 70, as well as the return spring 80 on the valve disc itself, work to the same end.

The positive pressure effort of the fluid pressure source, on one side of piston 26, is resisted by the spring force effort, through the guide rod 74 engaged to the passage member 48, on the other side.

The effort of the springs 68 and 70 are in turn controlled by the amount that the thumb screw adjustment 64 is turned down or backed off.

When light, quick responsive braking is desired the effort of springs 68 and 70 is minimized by backing-off the thumb screw 64. The fluid pressure effort is then resisted less, the vacuum cut off is easier to accomplish, and the atmospheric venting is also easier to achieve. However, to require greater fluid pressure effort the thumb screw 64 is turned down, the force of springs 68 and 70 is therefore greater and it is harder to move the passage member to engage the valve disc 86 and then lift it from its seat.

Whereas in the past the hydraulic effort was through spring means, of one kind or another, it is now resisted by spring means separate and apart therefrom.

Whereas in the past the hydraulic control springs which were used were in a chamber space between the fluid pressure source and the vacuum chamber space, with pressure losses to one or the other likely, they are now removed to an easily accessible place.

Whereas different hydraulic control springs had to be used before, and changes were frequently necessary, the same springs are used for different controls by simply being turned down more or less.

Whereas the spring force to vary the braking effort had to be overcome to both lift and reseat the atmospheric vent, before, now the spring force effort works to reseat the vent valve along with the vacuum pressure effort.

Without further discussion it will be appreciated that although a preferred embodiment of this invention has been shown and described in detail, such modifications and improvements as are within the scope of the teachings set forth, and accordingly, within the spirit of the invention, and not specifically excluded by the language of the hereinafter appended claims are to be considered as inclusive under such claims.

I claim:

1. A control valve for vehicle brake systems, and comprising;

a housing having a vacuum pressure chamber provided therein and a diaphragm member provided across said chamber, passage means provided through said diaphragm member and through said housing on opposite sides of said diaphragm member and including an atmospheric vent passage aligned with said diaphragm passage means, spring loaded means provided over said atmospheric vent passage for closure thereof, positive pressure means for engaging said diaphragm member and closing the passage means therethrough against the spring loaded closure means, and means provided outside said vacuum pressure chamber and extending through said atmospheric vent passage for variably resisting the effort of said positive pressure means to close said diaphragm passage means against said closure means.

2. The control valve of claim 1, said vent passage closure means including adjustable spring means for varying the positive pressure resistance thereof and having said variable resisting means received centrally therethrough.

3. The control valve of claim 1, said diaphragm passage means including a fitting provided on said diaphragm member and having a passageway provided therethrough and receiving said variable resisting means therewithin, and said fitting being undersized relative to the vent passage provided through said housing for closing said passageway against the vent passage closure means and providing an annular vent passageway externally thereof.

4. The control valve of claim 3, said vent passage closure means and variable resisting means including adjustable spring means for varying the positive pressure resistance thereof of each in resistive engagement with said fitting.

5. A control valve for vehicle brake systems, and comprising;
- a housing member having a vacuum pressure chamber provided therein and a diaphragm member provided across said chamber,
- a fitting provided on said diaphragm member and including a passage provided therethrough,
- an atmospheric vent port provided through said housing member and aligned with said fitting to receive said fitting therein and partially therethrough,
- a valve seat closure provided over said vent port for closing said port and the passage of said fitting as received thereagainst,
- a guide rod provided through said valve seat closure and engaged to said fitting,
- and spring means disposed outside said vacuum pressure chamber housing member and engaged to said guide rod for resisting efforts to move said diaphragm fitting to engage and lift said closure member and to hold said closure seated.

6. The control valve of claim 5,
- said guide rod having a spring seat provided thereon and having the spring means holding said closure sealed and the spring means for resisting efforts to move said fitting engaged with relatively opposite sides thereof,
- and thumb screw means for adjusting the spring force of said last mentioned spring means and of the first mentioned spring means therewith.

References Cited
UNITED STATES PATENTS 2,279,276  4/1942  Oliver _____ 303—7

FOREIGN PATENTS 547,809  11/1959  Belgium.
839,676  6/1960  Great Britain.

FERGUS S. MIDDLETON, *Primary Examiner.*

MILTON BUCHLER, *Examiner.*

T. M. BLIX, *Assistant Examiner.*